United States Patent
Kidd (10) Patent No.: US 10,090,749 B2
(45) Date of Patent: Oct. 2, 2018

(54) MAGNETIC GEARS FOR A CONTACTLESS AND FRICTIONLESS MAGNETIC GEAR SYSTEM

(71) Applicant: JAK Research, LLC, Idaho Falls, ID (US)

(72) Inventor: Justin D. Kidd, Idaho Falls, ID (US)

(73) Assignee: JAK Research, LLC, Idaho Falls, ID (US)

( * ) Notice: Subject to any disclaimer, the term of this patent is extended or adjusted under 35 U.S.C. 154(b) by 1072 days.

(21) Appl. No.: 14/204,903

(22) Filed: Mar. 11, 2014

(65) Prior Publication Data

US 2015/0263597 A1 Sep. 17, 2015

(51) Int. Cl.
*H02K 49/10* (2006.01)
*H02K 49/00* (2006.01)
*H02K 49/02* (2006.01)

(52) U.S. Cl.
CPC ........... *H02K 49/102* (2013.01); *H02K 49/00* (2013.01); *H02K 49/02* (2013.01); *H02K 49/10* (2013.01); *H02K 49/104* (2013.01); *Y02E 10/725* (2013.01)

(58) Field of Classification Search
CPC ........ H02K 49/00; H02K 49/02; H02K 49/10; H02K 49/102; H02K 49/104; Y02E 10/275
USPC .............. 310/80, 83, 94, 99, 103, 113, 114, 310/156.16, 156.17, 156.18, 156.24
See application file for complete search history.

(56) References Cited

U.S. PATENT DOCUMENTS

| 2,243,555 | A | | 5/1941 | Faus | |
|---|---|---|---|---|---|
| 2,985,779 | A | * | 5/1961 | Flaningam | H02K 1/278 310/156.18 |
| 3,400,287 | A | | 9/1968 | Huff | |
| 3,488,535 | A | * | 1/1970 | Baermann | H02K 49/00 310/105 |
| 4,814,654 | A | * | 3/1989 | Gerfast | H02K 1/2726 310/154.28 |

(Continued)

FOREIGN PATENT DOCUMENTS

| DE | 3841011 A1 * | 6/1990 | ............. B61B 13/12 |
|---|---|---|---|
| EP | 1069671 | 1/2001 | |

(Continued)

OTHER PUBLICATIONS

Kanzaki et al., English Machine Translation of JP59217057, Dec. 1984.*

(Continued)

*Primary Examiner* — Bernard Rojas
*Assistant Examiner* — Rashad Johnson
(74) *Attorney, Agent, or Firm* — Schmeiser, Olsen & Watts LLP (57) ABSTRACT

A magnetic gear system for use anywhere gears are required. The magnetic gear system incorporating magnetic gears including at least one end plate and at least one axle coupled to the at least one end plate. A plurality of magnet holders are also coupled to the at least one end plate. At least one magnet is contained in each of the plurality of magnet holders. Wherein the at least one magnet comprises two opposite polarities and the plurality of magnet holders are coupled to the at least one end plate with the at least one magnet having at least one polarity adjacent a similar polarity of another of the at least one magnets.

20 Claims, 7 Drawing Sheets

(56) References Cited

U.S. PATENT DOCUMENTS

| | | | |
|---|---|---|---|
| 4,850,821 A | | 7/1989 | Sakai |
| 5,013,949 A | | 5/1991 | Mabe, Jr. |
| 5,569,967 A | | 10/1996 | Rode |
| 5,684,352 A | * | 11/1997 | Mita ..................... H02K 1/02 |
| | | | 310/152 |
| 5,861,692 A | | 1/1999 | Furlani et al. |
| 6,047,456 A | * | 4/2000 | Yao .................... H02K 49/102 |
| | | | 29/407.05 |
| 7,421,929 B2 | | 9/2008 | French |
| 7,973,441 B2 | | 6/2011 | Atallah |
| 8,232,700 B2 | * | 7/2012 | Dooley ................. H02K 16/02 |
| | | | 310/113 |
| 8,581,461 B2 | | 11/2013 | Lin et al. |
| 9,293,977 B2 | * | 3/2016 | Whitfield .............. B63H 23/22 |
| 2005/0194854 A1 | * | 9/2005 | Agnes .................... H02K 1/17 |
| | | | 310/154.13 |
| 2013/0285497 A1 | | 10/2013 | French |

FOREIGN PATENT DOCUMENTS

| | | | | |
|---|---|---|---|---|
| JP | 59217057 A | * | 12/1984 | .......... F16H 49/005 |
| JP | 2013021780 A | * | 1/2013 | |

OTHER PUBLICATIONS

Urlich et al., English Machine Translation of DE3841011, Jun. 1990.*

Shinoda et al., English Translation of JP2013021780A, Jan. 31, 2013.*

* cited by examiner

MAGNETIC GEARS FOR A CONTACTLESS AND FRICTIONLESS MAGNETIC GEAR SYSTEM

BACKGROUND OF THE INVENTION

1. Technical Field

This invention relates to a contactless, frictionless, magnetic gear system.

2. Background Art

Gears have been used in mechanical devices for centuries. The origin of gears can be traced back to the 27$^{th}$ century BC in China.

Gears and gear systems can be used in many different types of mechanical devices and for many different purposes. Gears are used in vehicle transmissions, wind turbines, elevators, helicopters and the like.

Two round gears of different sizes can alter the speed and direction of rotational force. This includes changing the direction of the rotation or changing the rotational axis from vertical to horizontal and the like. Gears can also be used to change torque.

The biggest problem with gears and gear systems is the loss of energy due to friction caused by the gears mating. Gears and gear systems also experience significant stresses due to their interaction with other gears which may lead to failure of the gears and gear systems. In order to overcome these issues, magnetic gears and gear systems have been created. These gear systems are contactless and frictionless. Therefore, the magnetic gears and gear systems lose less energy and experience less stress than traditional gears and gear systems.

Examples of magnetic gear systems can be found in U.S. Pat. No. 2,243,555 issued to Faus, U.S. Pat. No. 3,400,287 issued to Huff, U.S. Pat. No. 7,421,929 issued to French, U.S. Publication No. 2013/02854597, and European Patent Application EP1069671A1. These references all disclose magnetic gear systems in which the magnets are positioned so that one pole is on the outside of the gear. This means that the gear has either an all North or an all South polarity. The other gear in the configuration will either have the same or opposite polarity on the outside of the gear, depending on if the gear system uses attraction or repulsion.

U.S. Pat. No. 5,569,967 issued to Rode describes a magnetic gear system where bar magnets are positioned along the outside of the gear. The first bar magnet is positioned so that its North polarity is at one side of the edge of the gear and the South polarity is at the other side of the edge of the gear. The second bar magnet is then positioned with its polarities on opposite sides of the gear from the first bar magnet. The rest of the bar magnets are also positioned in this alternating pattern.

The magnetic gear systems disclosed in these references and which are currently in use incorporate magnet arrangements which fail to optimize the magnetic fields and potential energy of the magnets.

Accordingly, what is needed is a magnetic gear system that has a magnet arrangement which maximizes the use of the magnetic fields and potential energy of the magnets to aid the transfer of energy through the magnetic gear system.

DISCLOSURE OF THE INVENTION

A magnetic gear from a magnetic gear system disclosed hereafter may include a plurality of magnets wherein each magnet of the plurality of magnets has a North polarity and a South polarity. The plurality of magnets are positioned with the North polarity of each of the plurality of magnets adjacent the North polarity of another of the plurality of magnets and the plurality of magnets are positioned with the South polarity of each of the plurality of magnets adjacent the South polarity of another of the plurality of magnets.

An additional embodiment of a magnetic gear system may include at least one first magnetic gear and at least one second magnetic gear. The at least one first magnetic gear and at least one second magnetic gear each includes a plurality of magnets. Each magnet of the plurality of magnets further includes a North polarity and a South polarity. The plurality of magnets being positioned so that each magnet of the plurality of magnets has the North polarity adjacent the North polarity of another magnet of the plurality of magnets on the at least one first magnetic gear and the plurality of magnets being positioned so that each magnet of the plurality of magnets has the North polarity adjacent the North polarity of another magnet of the plurality of magnets on the at least one second magnetic gear.

An alternate embodiment of a magnetic gear for use in a magnetic gear system may include at least one end plate and at least one axle coupled to the at least one end plate. A plurality of magnet holders may be coupled to the at least one end plate with at least one magnet coupled to each of the plurality of magnet holders. The at least one magnet has two opposite polarities and the plurality of magnet holders are coupled to the at least one end plate with the at least one magnet having at least one polarity adjacent a similar polarity of another of the at least one magnets.

The foregoing and other features and advantages of the magnetic gear system will be apparent to those of ordinary skill in the art from the following more particular description of the invention and the accompanying drawings.

BRIEF DESCRIPTION OF THE DRAWINGS

The invention will hereinafter be described in conjunction with the appended drawings where like designations denote like elements, and.

DESCRIPTION OF THE INVENTION

As discussed above, embodiments of the present invention relate to magnetic gears which create contactless, frictionless gear systems. In particular, disclosed are magnetic gears and magnetic gear systems which reduce the loss of energy transferred between multiple gears.

Figure 1:
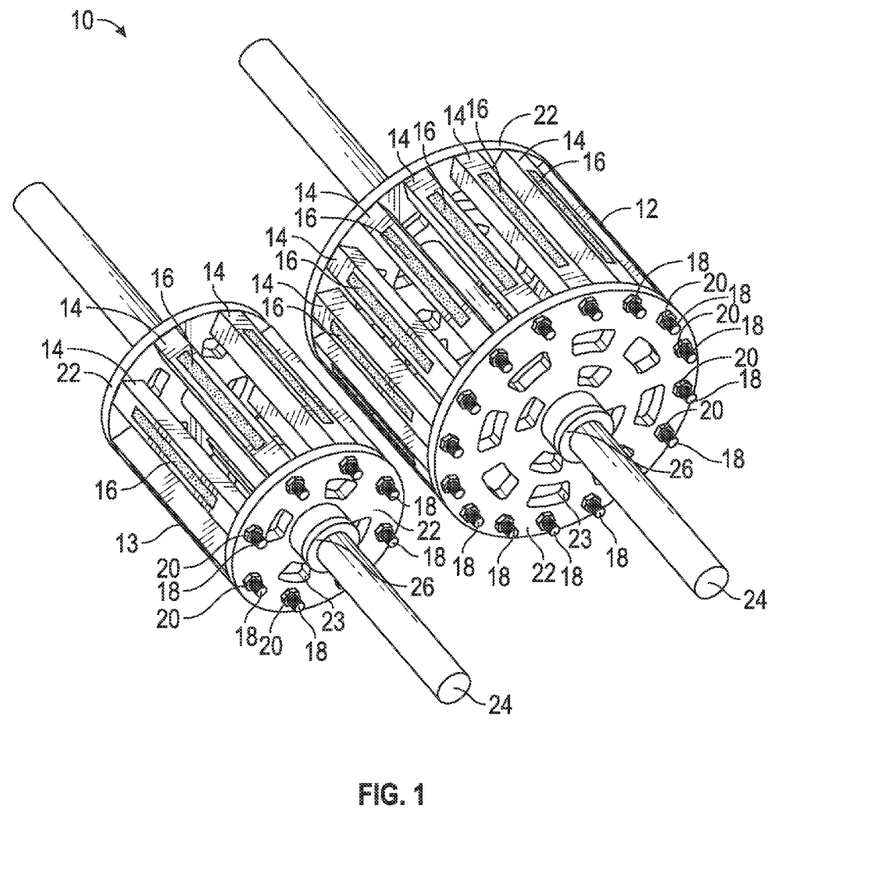
FIG. 1 is an isometric view of a magnetic gear system.
Figure 2:
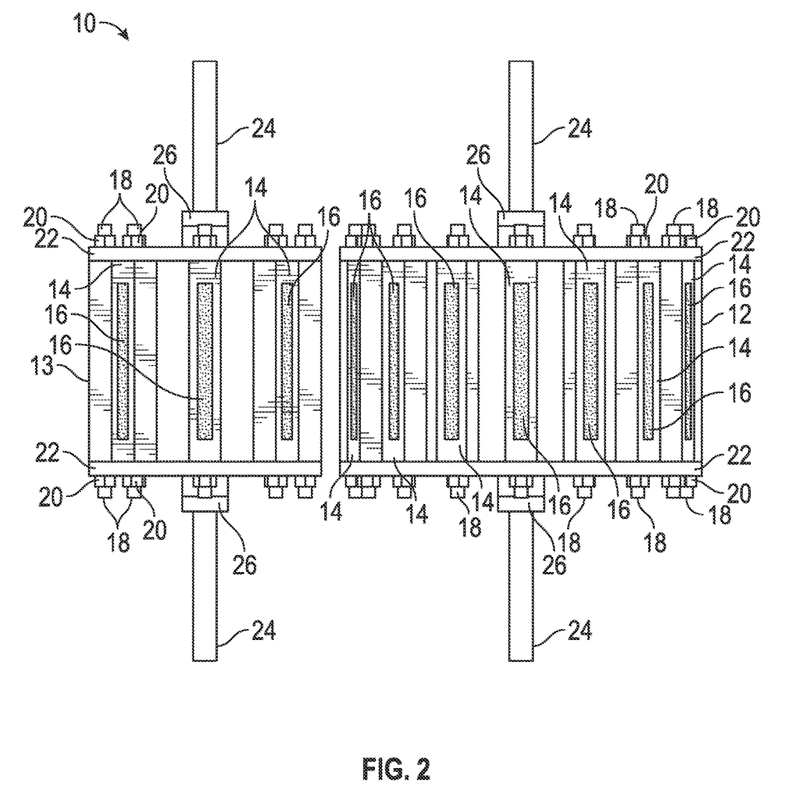
FIG. 2 is a top view of a magnetic gear system.
Figure 3:
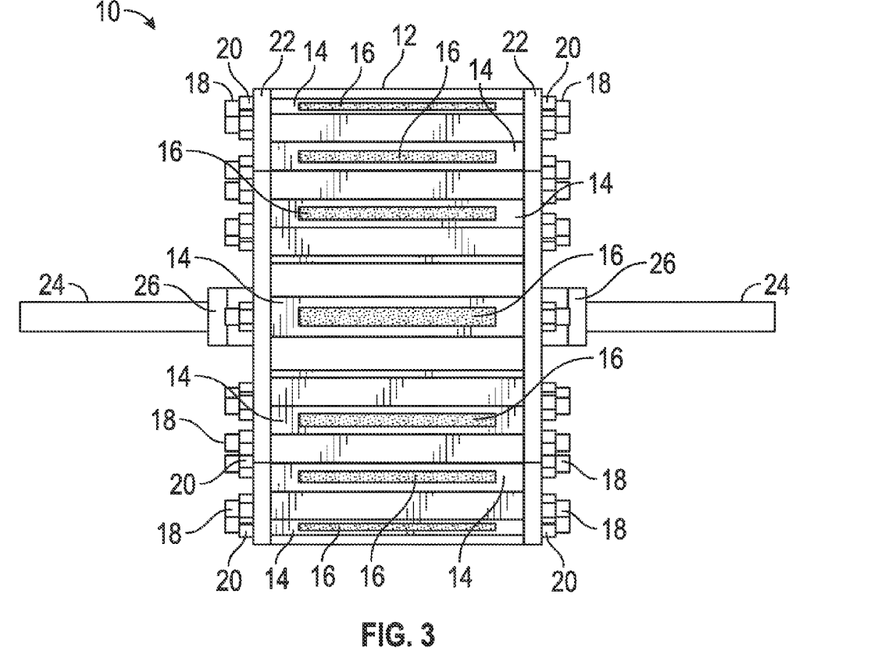
FIG. 3 is a right side view of a magnetic gear system.

FIGS. 1-3 illustrate a magnetic gear system 10. Magnetic gear system 10 comprises at least one first magnetic gear 12 and at least one second magnetic gear 13, which interact with each other. Energy may be input into the magnetic gear system 10 by rotating either the first magnetic gear 12 or the second magnetic gear 13. For exemplary purposes, the first magnetic gear 12 will be the input gear; however, in practice, either the first magnetic gear 12 or the second magnetic gear 13 may be used as the input gear in the magnetic gear system 10. Energy may be input to the first magnetic gear 12 by a motor, by a person or by any other energy source desired. When energy is input into the magnetic gear system 10 by rotating the first magnetic gear 12, the second magnetic gear 13 also rotates provided it is located close enough to the first magnetic gear 12 for the magnetic fields of the first magnetic gear 12 and the second magnetic gear 13 to interact.

When energy is input to the first magnetic gear 12, the second magnetic gear 13 rotates as if they were traditional gears with meshing teeth or like two sprockets connected with a chain or the like. The second magnetic gear 13 may be used to output the energy from the magnetic gear system 10.

The energy input into the magnetic gear system 10 is altered depending on the size and orientation of the first magnetic gear 12 and the second magnetic gear 13 in the magnetic gear system 10. For example, if the magnetic gear 12, which has energy input to it, is larger than the second magnetic gear 13. The second magnetic gear 13 will rotate faster than the first magnetic gear 12. If the second magnetic gear 13 is rotated 90 degrees from the first magnetic gear 12, then the rotational output of the second magnetic gear 13 will be oriented 90 degrees from the rotation of the first magnetic gear 12. If the first magnetic gear 12 is a pinion gear and the second magnetic gear 13 is a rack gear, then the rotation of the first magnetic gear 12 will be converted to linear motion. It may also be possible for the potential energy of the magnetic fields in the first magnetic gear 12 and the second magnetic gear 13 to amplify or augment the energy input into the magnetic gear system 10.

Multiple first magnetic gears 12 and multiple second magnetic gears 13 may be used in the magnetic gear system 10. The first magnetic gear 12 and the second magnetic gear 13 may be any size or configuration desired in order to convert the input energy to the desired output. The first magnetic gear 12 and the second magnetic gear 13 may be formed as a rack and pinion, a planet system, an inline transmission or the like.

First magnetic gear 12 and second magnetic gear 13 in the magnetic gear system 10, unlike traditional gear systems, do not require contact to function. Therefore there is no loss of energy due to friction between the first magnetic gear 12 and the second magnetic gear 13 in the magnetic gear system 10. The first magnetic gear 12 and the second magnetic gear 13 must simply be close enough for the magnetic fields created by the first magnetic gear 12 and the second magnetic gear 13 to interact with each other.

Though there is no energy loss due to friction between the first magnetic gear 12 and the second magnetic gear 13, friction between other moving parts in the system may create a negligible energy loss.

Figure 4:
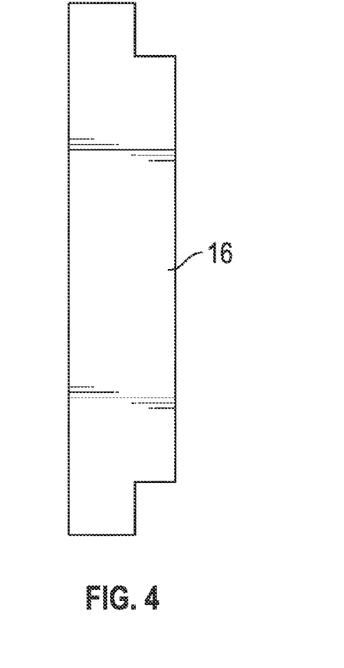
FIG. 4 is a side view of a magnet.
Figure 5:
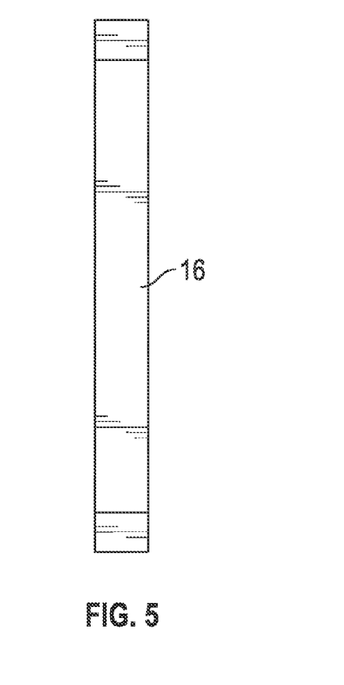
FIG. 5 is a top view of a magnet.

The first magnetic gear 12 and the second magnetic gear 13 of the magnetic gear system 10 may include or comprise a plurality of magnets 16. The magnets 16 used to create the first magnetic gear 12 and the second magnetic gear 13 are illustrated in FIGS. 4-5. The magnets 16 may be formed from rare earth magnets. Rare earth magnets are strong, permanent magnets. Other types of magnets may be used to form the magnets 16 in the first magnetic gear 12 and the second magnetic gear 13. However, the magnets 16 may ideally be formed from a strong magnet which does not easily lose its magnetism.

The magnets 16 illustrated in FIGS. 4-5 are formed as thin rectangular prisms with a square or step cut out of the two upper ends of the rectangular prisms. This shape aids the magnets 16 in being mounted in the first magnetic gear 12 and the second magnetic gear 13. The magnets 16, however, may be formed in any shape desired, such as circular, spherical, hemispherical, pyramidal, triangular, square, cubic or the like.

The magnets 16 may be formed as one single piece of material, or they may be formed as multiple magnets which may be coupled together or simply placed near each other.

Each magnet 16 also includes or has two opposite polarities, i.e. a North and a South polarity. The magnets 16 should be formed so that the separation between the North and South polarities runs parallel to the long axis of the magnet 16. However, in alternate embodiments, it may be desirable for the polarity of the magnets 16 to be oriented so that the separation between the North and South polarities is parallel to the short axis of the magnet 16. Though, in order to properly balance the first magnetic gear 12 and the second magnetic gear 13, it may be desirable to shape the magnets 16 so that they are symmetrical around the division between the opposite polarities.

Figure 6:
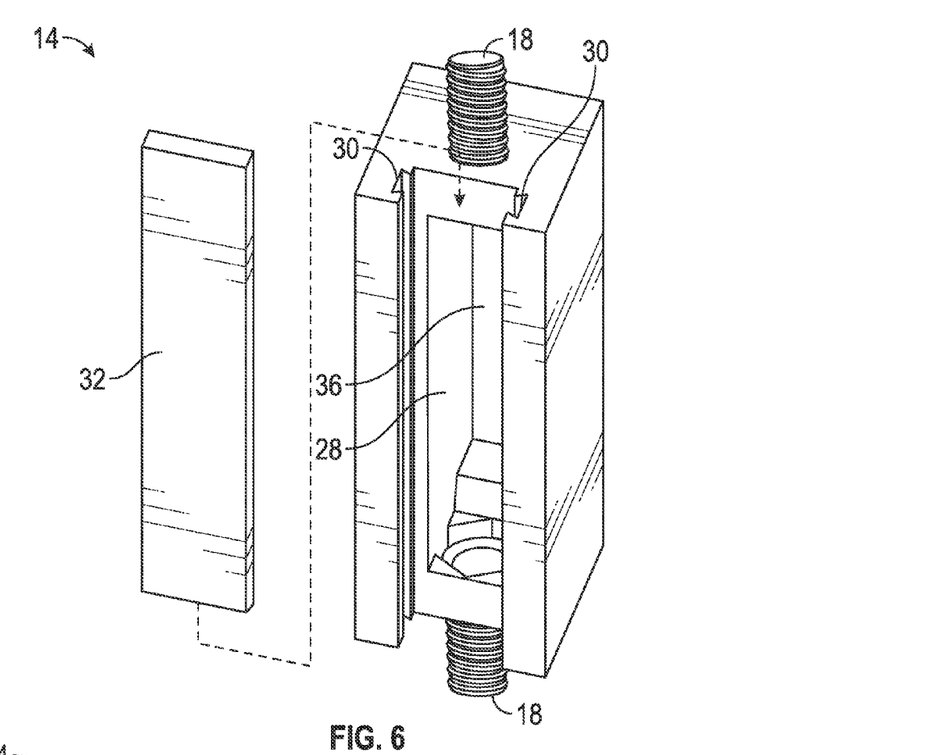
FIG. 6 is an isometric view of a magnet holder.
Figure 7:
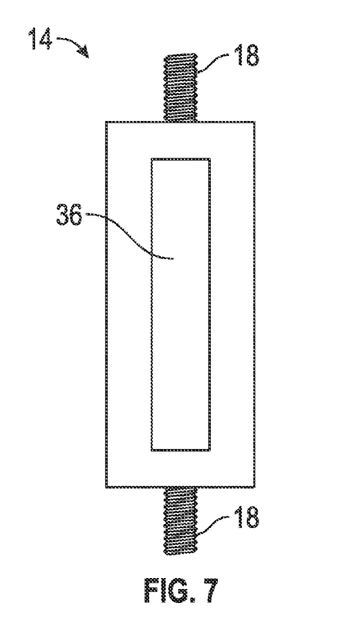
FIG. 7 is a front view of a magnet holder.
Figure 8:
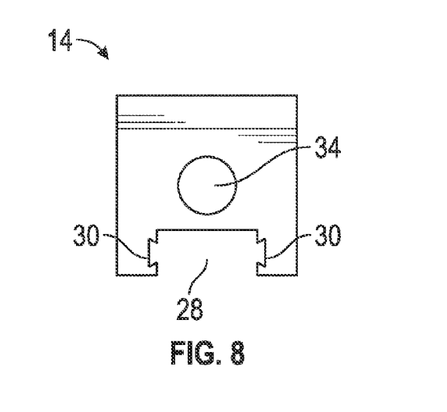
FIG. 8 is top view of a magnet holder.

The magnets 16 are mounted in magnet holders 14. Magnet holders 14 are illustrated in FIGS. 6-8. The magnet holders 14 serve to hold the magnets 16 in perfect alignment. The magnet holders 14 also protect the magnets 16 which is important because rare earth magnets are more fragile than other types of magnets.

Magnet holders 14 may be formed as a rectangular prism as illustrated in the figures or the magnet holders 14 may be formed in any size or shape desired. The magnet holders 14 may be formed as a sphere, circle, square, cube, rectangle, or the like. It may be desirable, however, to form the magnet holders 14 in a shape similar to that of the magnets 16 in order to limit the weight and bulk of the magnet holders 14. It may also be desirable to form the magnet holders 14 in a shape similar to that of the magnets 16 in order to better secure the magnets 16.

The magnet holders 14 may be formed in one piece or they may be formed in multiple pieces and coupled together.

The magnet holders 14 may be formed from wood, metal, plastic, ceramic or the like. The magnet holders 14 should, however, be formed from a material which is strong enough to withstand the weight of the magnet 16 and the other forces placed on it. The magnet holders 14 should also not be formed from a material which interferes with the magnetism of the magnet 16.

The magnet holders 14 may have a magnet insertion opening 28 which is an opening in the back or bottom of the magnet holders 14. The magnet insertion opening 28 is the opening through which the magnet 16 is inserted into the magnet holder 14. The magnet insertion opening 28 may be rectangular as illustrated in the figures, or the magnet insertion opening 28 may be any size or shape which allows the magnet 16 to be inserted into the magnet holder 14.

Once the magnet 16 is inserted though the magnet insertion opening 28 a cover 32 is inserted through the cover slots 30 in the back or bottom of the magnet holder 14 in order to close the magnet insertion opening 28.

The cover slots 30 are two slots that run along the inside vertical edges of the magnet insertion opening 28. These slots 30 hold a cover 32 in place over the magnet insertion opening 28.

In alternate embodiments, the cover slots 30 could be formed in order to allow the cover 32 to snap into place, to rotate into place or the like.

The cover 32 may be formed as a flat rectangle as illustrated in the figures, or the cover 32 could be any shape desired, provided the cover 32 secures the magnet 16 in place in the magnet holder 14. In alternate embodiments, the cover 32 may have a thicker cross section along its longest sides in order to fit more securely in the cover slots 30. The cover 32 may be rotatably, hingedly, slidably or clickably coupled to the magnet holder 14.

The cover 32 may be formed from the same material that the magnet holder 14 is formed from or else the cover 32 may be formed from any material that is strong enough to prevent the magnet 16 from falling out of the magnet holder 14. The cover 32 may be formed from wood, metal, ceramic, plastic or the like. The cover 32 may be formed in one piece or may be formed in multiple pieces.

The face of the magnet holder 14 opposite the magnet insertion opening 28, the front or top of the magnet holder 14, may include a holder opening 36. The holder opening 36 is formed to receive the top of the magnet 16. The magnet 16 fits into the holder opening 36 with the top of the magnet 16 extending through the holder opening 36.

The holder opening 36 may be any shape or size desired, however, the holder opening 36 should not be so big that the magnet 16 can fall through the holder opening 36.

The smallest ends of the magnet holder 14 which are illustrated as the top and bottom of the magnet holder 14 in FIGS. 6-8 comprise bolt openings 34. Bolt openings 34 are openings drilled or cut in the top and bottom of the magnet holder 14 in order to receive magnet holder bolts 18. The magnet holder bolts 18 may be screwed, welded, compression fit or the like into the bolt openings 34 on the magnet holder 14. The magnet holder bolts 18 may also be secured into place with a pin or a bolt which travels through a lip surrounding the bolt openings 34, through the magnet holder bolt 18 and then is secured in the lip on the other side of the bolt opening 34. The bolt openings 34 may have a lip surrounding them. The bolt openings 34 may also be threaded or the like.

FIGS. 1-3 further illustrate the magnet holders 14 coupled to at least one end plate 22. The at least one end plate 22 illustrated in the figures is a flat circular plate which has openings in it, through which the magnet holder bolts 18 are inserted. The at least one end plate 22 serves as support for the magnet holders 14. The at least one end plate 22 also secures the magnets 16 and the magnet holders 14 into a symmetrical configuration.

In the figures, two end plates 22 are used. The two end plates 22 are identical and when coupled with the magnet holders 14 they secure the magnets 16 into a cylindrical configuration.

The two end plates 22 illustrated are flat circular pieces of metal, however, the end plates 22 may be formed in any shape desired. For example, if the end plates 22 are flat rectangular pieces of metal, the first magnetic gear 12 or second magnetic gear 13 formed with a rectangular end plate 22 would be a rack gear. The two end plates 22 could also be triangular, hexagonal, pentagonal, square or the like.

The two end plates 22 may be formed from metal, wood, plastic or any other material which is suitably strong, durable and lightweight.

The two end plates 22 may include at least one cutout 23. The at least one cutout 23 are areas of the end plates 22 where material has been removed in order to leave openings in the end plates 22. The at least one cutout 23 makes the end plates 22 lighter and therefore reduces any energy loss due to the weight of the first magnetic gear 12 and the second magnetic gear 13. The at least one cutout 23, as illustrated in the figures, may be a rounded trapezoid or it may be a square, circle, triangle, rectangle, oval, pentagon, octagon, parallelogram or the like. The at least one cutout 23 may be any size or shape desired, provided that the at least one cutout 23 does not impair the strength and structural stability of the end plates 22. The at least one cutout 23 may extend through the entire thickness of the end plate 22 or else the at least one cutout 23 may only extend partially through the thickness of the end plate 22.

The two end plates 22 also have openings placed around the circumference or edge of the end plates 22 in order to receive the magnet holder bolts 18 of the magnet holders 14. These openings are evenly spaced in order to assure that the magnets 16 are evenly spaced around the first magnetic gear 12 and around the second magnetic gear 13.

In the embodiments illustrated in FIGS. 1-3, the openings are also all spaced the same distance from the edge of the two end plates 22. By altering the position of the openings with respect to the edge of the end plate 22 or with respect to the other magnet holders 14, the properties of the first magnetic gear 12 or the second magnetic gear 13 may be altered.

Examples may include, each opening being located 1/16 inch or the like farther from the edge of the end plate 22 than the opening was located. This creates a spiral type shape to the magnet 16 locations. In order to maintain balance of the first magnetic gear 12 or the second magnetic gear 13, a spiral may be created on each half of the circumference of the end plate 22. The spirals created would be opposite of each other in order to maintain balance.

When the magnets 16 in the first magnetic gear 12 and the second magnetic gear 13 in a magnetic gear system 10 are positioned in a spiral configuration as discussed above, the magnetic force of the magnets 16 themselves rotate the first magnetic gear 12 and the second magnetic gear 13 until the magnets 16 positioned closest to the edge of the end plate 22 on each gear are aligned with each other.

Additional embodiments of the first magnetic gear 12 and the second magnetic gear 13 with a spiral magnet configuration may include each quarter of the circumference of the at least one end plate 22 consisting of a spiral magnet 16 configuration. The spirals would be oriented so that there is overall balance of the first magnetic gear 12 or the second magnetic gear 13.

Other embodiments utilizing the spiral magnet 16 configuration may also be used. For example, the magnets 16 may be spaced more or less than 1/16 inch farther from the edge of the end plate 22 than the previous magnet 16 was placed. The spacing may also increase, decrease or vary between each magnet 16 and the previous magnet 16. For example, the first magnet 16 may be located close to the edge of the end plate 22. The second magnet 16 may be located 1/16 of an inch farther from the edge of the end plate 22. The third magnet 16 may be placed 1/8 of an inch farther from the edge of the end plate 22 than the previous magnet 16 and so forth.

Alternate embodiments of a first magnetic gear 12 and a second magnetic gear 13 may also include the magnets 16 being spaced so that the first magnet 16 is located near the edge of the end plate 22. The second magnet 16 would be located farther from the edge of the end plate 22. The third magnet 16 would be located the same distance from the edge of the end plate 22 as the first magnet 16 was located and the like.

The magnets 16 or the openings in the end plates 22 in the first magnetic gear 12 and the second magnetic gear 13 may be located in anyway desired in order to achieve the desired result.

The magnet holder bolts 18 are inserted through the openings placed around the circumference of the end plate 22. Then the magnet holder bolts 18 are secured in position by the magnet holder nuts 20. By securing the magnet holders 14 to the end plates 22 in this manner, the magnet holders 14 may be removed for repair or in order to rebalance the first magnetic gear 12 or the second magnetic gear 13.

The magnet holder nuts 20 may be any size standard nut which fits the magnet holder bolts 18. The magnet holder nuts 20 may also be locking bolts or may be a combination of washers and nuts, in order to secure the magnet holders 14 in the appropriate positions.

In alternate embodiments, the magnet holders 14 may be permanently coupled to the end plates 22. The magnet holders 14 may also be coupled to the end plates 22 using pins, welding, glue, rivets, epoxy or the like.

Each end plate 22 has an opening in the center of the end plate 22. This opening is surrounded by collar 26. Collar 26 surrounds the opening in the center of the end plate 22 and allows the end plate 22 to be secured to axle 24. The collar 26 is a sleeve or hollow cylindrical member which is fixedly coupled to the end plate 22. The collar 26 may also be removably coupled to the end plate 22 in order to allow the collar 26 to be replaced if needed.

Axle 24 is a cylindrical member which runs through the collar 26 coupled to one of the end plates 22, through the center of the first magnetic gear 12 or the second magnetic gear 13 and then out the collar 26 which is coupled to the other end plate 22. The axle 24 may be rotatably or non-rotatably coupled to the collar 26. Typically in situations where energy is going to be input to a first magnetic gear 12 or energy is going to be output from a second magnetic gear 13, the axle 24 will be non-rotatably or fixedly coupled to the collar 26. This causes the axle 24 to rotate along with the first magnetic gear 12 or the second magnetic gear 13. Therefore, energy can be input to the first magnetic gear 12 by rotating the axle 24 with a motor or the like. Energy could also be removed from the gear system 10 by coupling a generator or the like to the rotating axle 24 of the second magnetic gear 13 in a gear system 10.

If, however, the first magnetic gear 12 or the second magnetic gear 13 is simply an intermediary gear and not an input gear or an output gear in the gear system 10, it may be desirable to have the axle 24 rotatably coupled to the first magnetic gear 12 or the second magnetic gear 13 so that the first magnetic gear 12 or the second magnetic gear 13 can rotate freely about the axle 24.

The axle 24 may be coupled to the collar by welding, epoxy, bolting, gluing, or the like. The axle 24 may also be coupled to the collar by a pin which extends through one side of the collar, through the axle and into the other side of the collar where the pin is secured.

The axle 24 illustrated in the figures is a long cylindrical member, however, the axle 24 may be formed in any shape or length desired, provided energy can be input or output by the axle 24.

The axle 24 may be formed from any material desired, such as metal, plastic, wood, ceramic, glass or the like. The axle 24 should, however, be formed from a material strong enough to withstand the torsional forces placed on it by the rotating first magnetic gear 12 or second magnetic gear 13. The axle 24 must also support the weight of the first magnetic gear 12 or the second magnetic gear 13.

The axle 24 may travel completely through the first magnetic gear 12 or the second magnetic gear 13, or the axle 24 may be formed from two separate pieces. If the axle 24 is formed from two pieces, each piece would extend outward from the first magnetic gear 12 or the second magnetic gear 13. The pieces would be coupled to each end plate 22 and would continue outward in order to allow energy to be input or output from the gear system 10.

Figure 9:
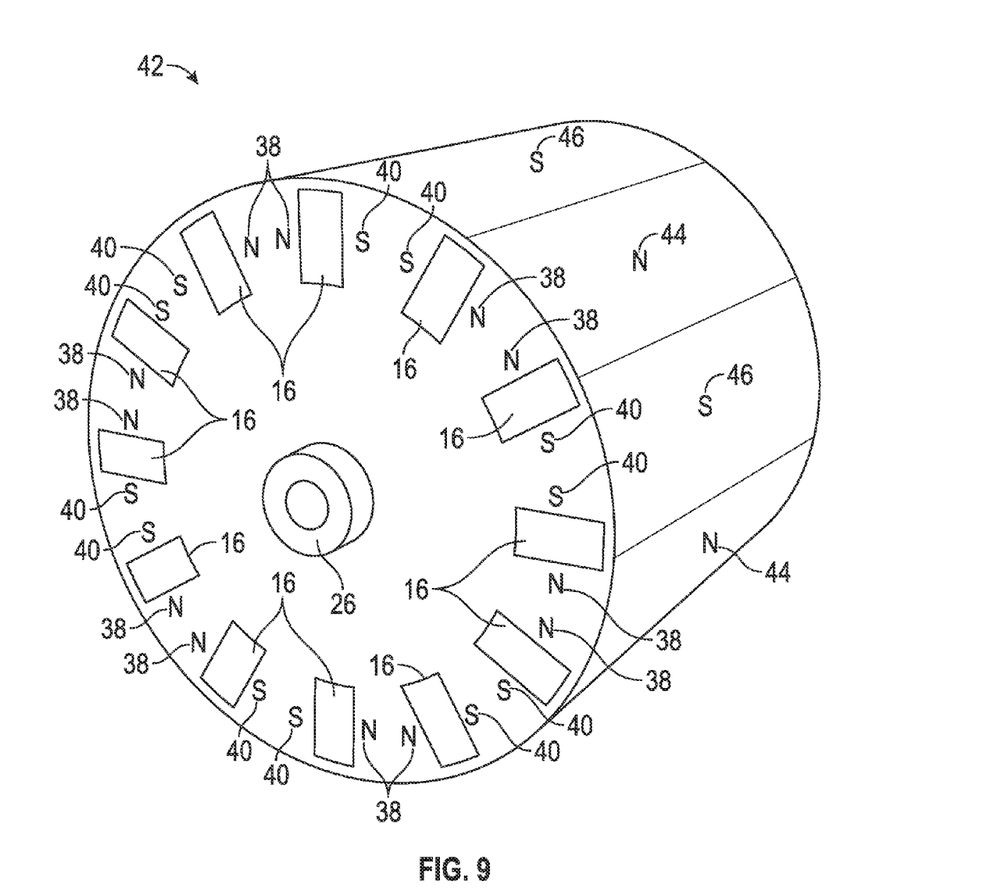
FIG. 9 is an isometric view of polarities of a magnetic gear.
Figure 10:
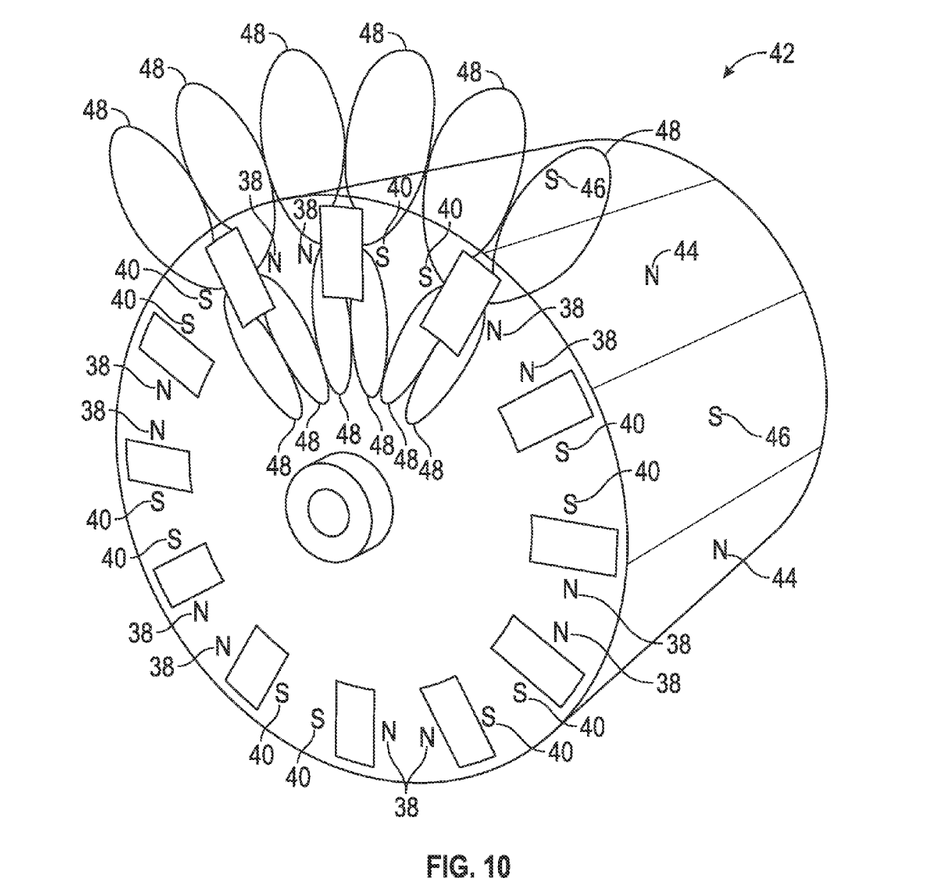
FIG. 10 is an isometric view of polarities of a magnetic gear with magnetic field lines.

FIGS. 9-10 are representations 42 of the polarities and magnetic forces involved in the functioning of the magnetic gear systems 10. FIG. 9 illustrates the orientation of the magnets 16 in the first magnetic gear 12 and the second magnetic gear 13. The magnets 16 as discussed previously have two opposite polarities oriented so that the dividing line between the polarities runs parallel to the long access of the magnet 16. The magnets 16 are positioned in the gear so that the dividing line between the polarities runs parallel to the longitude of the axle or parallel to the longitude of the cylindrical gear.

The magnets 16 are also evenly spaced around the circumference of the first magnetic gear 12 and the second magnetic gear 13. Spacing the magnets 16 evenly around the circumference of the first magnetic gear 12 and the second magnetic gear 13 balances the first magnetic gear 12 and the second magnetic gear 13 so that the magnetic fields around the first magnetic gear 12 and the second magnetic gear 13 are balanced. This helps to prevent the first magnetic gear 12 and the second magnetic gear 13 from wobbling, slipping or the like.

When the magnet holders 14 are secured to the end plates 22, the magnets 16 are arranged so that each magnet's 16 North polarity 38 is adjacent to the next magnet's 16 North polarity 38. The next magnet's South polarity 40 is then adjacent to a third magnet's 16 South polarity 40 and so forth, until magnet holders 14 have been secured in all of the locations in the end plates 22. In order to make this configuration work, it is necessary to have an even number of magnets 16 and magnet holders 14 coupled to the end plates 22.

When the magnets 16 are arranged in this manner, the first magnetic gear 12 or the second magnetic gear 13 formed has regions with a North magnetic field 44 and regions with a South magnetic field 46. These magnetic fields interact with the magnetic fields on an adjacent first magnetic gear 12 or second magnetic gear 13 by either attracting or repelling the magnetic fields on the first magnetic gear 12 or second magnetic gear 13. If the North magnetic field 44 of a first magnetic gear 12 is adjacent the South magnetic field 46 of a second magnetic gear 13 then the two magnetic fields will repel each other causing the second magnetic gear 13 to rotate. If the North magnetic field 44 of a first magnetic gear 12 is adjacent the North magnetic field 44 of a second magnetic gear 13, then the magnetic fields will attract each other which may also cause the second magnetic gear 13 to rotate. If the first magnetic gear 12 in both of these examples is rotating, then the second magnetic gear 13 rotates due to the interactions discussed above.

Also, when the magnets 16 are arranged with polarities in one magnet 16 adjacent the like polarity in the next magnet 16, the two magnets 16 repel each other. When the magnets 16 are securely held in place, this repulsion causes the magnetic fields to push outward from the space between the magnets 16. This can be seen in the magnetic field lines 48 illustrated in FIG. 10. As can be seen in this figure, the magnetic fields between the magnets 16 push outward and form magnetic gear teeth which interact with the magnetic gear teeth on the adjacent first magnetic gear 12 or second magnetic gear 13.

Figure 11:
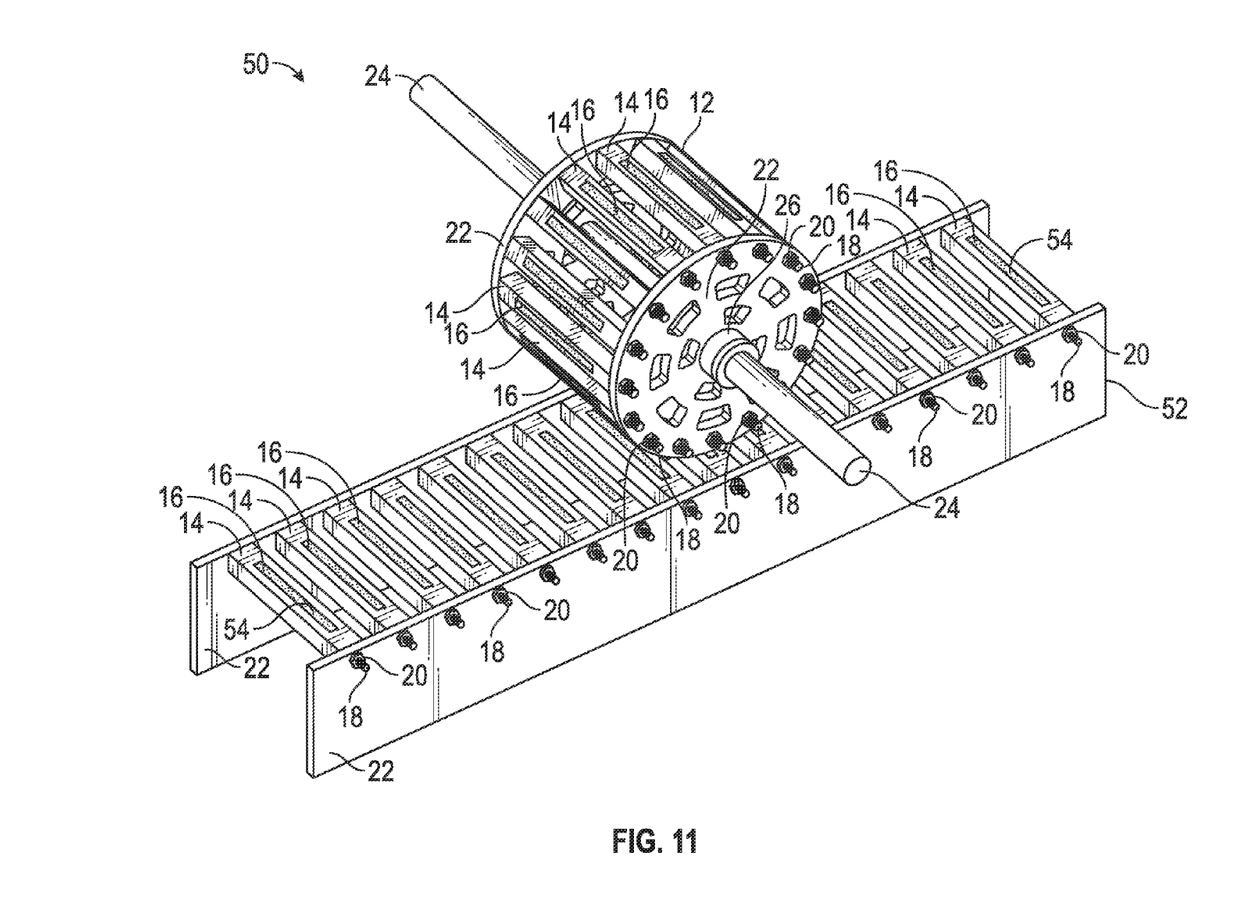
FIG. 11 is an isometric view of a rack and pinion magnetic gear system.

FIG. 11 illustrates an alternate embodiment of the magnetic gear system 50. In this configuration, the second magnetic gear is formed as a rack gear 52. The first magnetic gear 12 is a round or cylindrical gear as disclosed previously. The first magnetic gear 12 interacts with the rack gear 52 and the two gears together act as a rack and pinion gear set.

In the rack gear 52 configuration, the magnets 16 are all arranged with one magnet's 16 North polarity adjacent the next magnet's 16 North polarity and with the next magnet's 16 South polarity adjacent a third magnet's 16 South polarity, except for two end magnets 54. The two end magnets 54 are located at the ends of the rack gear 52. The two end magnets 54 each have one polarity that does not have an adjacent magnet 16. In the rack gear 52, typically, one of the two end magnets 54 will have a South polarity without an adjacent magnet 16 and the other end magnet 54 will have a North polarity without an adjacent magnet 16.

Additional embodiments of a first magnetic gear 12 or a second magnetic gear 13 may be configured similar to FIGS. 9-10. In these embodiments, the magnetic gear would be formed from a solid cylindrical member. The cylindrical member would have slots cut parallel to its longitude in order to receive a plurality of magnets. The cylindrical member would also have an opening drilled parallel to the cylindrical member's longitude in order to receive an axle. The opening drilled to receive the axle could also have a collar similar to the collar discussed above.

Additional embodiments of a magnetic gear system 10 may include using a first magnetic gear 12 or a second magnetic gear 13 as a permanent magnet alternator. In this embodiment, either a first magnetic gear 12 or a second magnetic gear 13 is used as a rotor and is surrounded by a stator. The stator in this case may be multiple coils of wire positioned in a cylindrical configuration surrounding either a first magnetic gear 12 or a second magnetic gear 13. Rotating the first magnetic gear 12 or the second magnetic gear 13 creates an electrical current in the multiple coils of the stator. This embodiment may also eliminate the need for an external motor hooked to the first magnetic gear 12 or an external generator hooked to the second magnetic gear 13 because the stator may be used to drive the first magnetic gear 12 or the second magnetic gear 13 and the stator may also be used to convert the rotation of the first magnetic gear 12 or the second magnetic gear 13 into electrical current.

Accordingly, for the exemplary purposes of this disclosure, the components defining any embodiment of the invention may be formed as one piece if it is possible for the components to still serve their function. The components may also be composed of any of many different types of materials or combinations thereof that can readily be formed into shaped objects provided that the components selected are consistent with the intended mechanical operation of the invention. For example, the components may be formed of rubbers (synthetic and/or natural), glasses, composites such as fiberglass, carbon-fiber and/or other like materials, polymers such as plastic, polycarbonate, PVC plastic, ABS plastic, polystyrene, polypropylene, acrylic, nylon, phenolic, any combination thereof, and/or other like materials, metals, such as zinc, magnesium, titanium, copper, iron, steel, stainless steel, any combination thereof, and/or other like materials, alloys, such as aluminum, and/or other like materials, any other suitable material, and/or any combination thereof.

The embodiments and examples set forth herein were presented in order to best explain the present invention and its practical applications and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims. Accordingly, any components of the present invention indicated in the drawings or herein are given as an example of possible components and not as a limitation.

The invention claimed is:

1. A magnetic gear comprising:
   a plurality of magnets; and
   a plurality of magnet holders, wherein at least one magnet contained in each of said plurality of magnet holders, each magnet holder of said plurality of magnet holders comprising: a magnet insertion opening and a holder opening through which each magnet in inserted and retained within the magnet insertion opening and a top of said at least one magnet extends through the holder opening, the magnet is retained in the magnet insertion opening by a cover coupled to the magnet holder;
   wherein each magnet of said plurality of magnets comprises a North polarity and a South polarity;
   wherein each magnet of said plurality of magnets comprises a dividing line between said North polarity and said South polarity;
   wherein said dividing line of each magnet of said plurality of magnets is positioned parallel to a longitude of an axle of the magnetic gear;
   wherein said plurality of magnets within the plurality of magnet holders are positioned with said North polarity of each of said plurality of magnets adjacent said North polarity of another of said plurality of magnets coupled within a magnet holder; and
   wherein said plurality of magnets within the plurality of magnet holders are positioned with said South polarity of each of said plurality of magnets adjacent said South polarity of another of said plurality of magnets coupled within the magnet holder.

2. The magnetic gear of claim 1, further comprising at least two end magnets and wherein each of said at least two end magnets comprise a North polarity and a South polarity.

3. The magnetic gear of claim 2, wherein at least one of said at least two end magnets is positioned with said North polarity adjacent to said North polarity of a magnet of said plurality of magnets and said South polarity of said at least one of said at least two end magnets positioned not adjacent to said plurality of magnets.

4. The magnetic gear of claim 2, wherein at least one of said at least two end magnets is positioned with said South polarity adjacent to said South polarity of a magnet of said plurality of magnets and said North polarity of said at least one of said at least two end magnets positioned not adjacent to said plurality of magnets.

5. The magnetic gear of claim 1, further comprising at least one end plate coupled to said plurality of magnets, wherein said at least one end plate secures said plurality of magnets in said position.

6. The magnetic gear of claim 5, wherein said at least one end plate further comprises at least one cutout configured as an empty opening in said at least one end plate.

7. A magnetic gear system comprising:
   at least one first magnetic gear and at least one second magnetic gear;
   wherein said at least one first magnetic gear and at least one second magnetic gear each comprise a plurality of magnets and a plurality of magnet holders, wherein at least one magnet contained in each of said plurality of magnet holders, each magnet holder of said plurality of magnet holders comprising: a magnet insertion opening and a holder opening through which each magnet in inserted and retained within the magnet insertion opening and a top of said at least one magnet extends through the holder opening, the magnet is retained in the magnet insertion opening by a cover coupled to the magnet holder;

each magnet of said plurality of magnets further comprising a North polarity and a South polarity;

each magnet of said plurality of magnets further comprising a dividing line between said North polarity and said South polarity;

said plurality of magnets within the plurality of magnet holders of said at least one first magnetic gear being positioned so that each magnet of said plurality of magnets has said dividing line parallel to a longitude of an axle of said at least one first magnetic gear;

said plurality of magnets within the plurality of magnet holders being positioned so that each magnet of said plurality of magnets on said at least one first magnetic gear has said North polarity adjacent said North polarity of another magnet of said plurality of magnets within the plurality of magnet holders on said at least one first magnetic gear; and said plurality of magnets within the plurality of magnet holders being positioned so that each magnet of said plurality of magnets on said at least one second magnetic gear has said North polarity adjacent said North polarity of another magnet of said plurality of magnets within the plurality of magnet holders on said at least one second magnetic gear.

8. The magnetic gear system of claim 7, wherein said at least one second magnetic gear further comprising at least two end magnets and wherein each of said at least two end magnets comprises either a North polarity or a South polarity without an adjacent magnet.

9. The magnetic gear system of claim 7, wherein said at least one first magnetic gear and at least one second magnetic gear are a rack and pinion.

10. The magnetic gear system of claim 7, wherein said at least one first magnetic gear and at least one second magnetic gear are a planetary gear set.

11. The magnetic gear system of claim 7, wherein said at least one first magnetic gear and at least one second magnetic gear are positioned perpendicular to each other.

12. The magnetic gear system of claim 7, wherein each magnet of said plurality of magnets is formed as a thin rectangular prism with at least two steps cut out of a top surface.

13. A magnetic gear comprising:
at least one end plate;
at least one axle coupled to said at least one end plate;
a plurality of magnet holders coupled to said at least one end plate;
at least one magnet contained in each of said plurality of magnet holders;
wherein each magnet holder of said plurality of magnet holders further comprises a magnet insertion opening and a holder opening each magnet in inserted and retained within the magnet insertion opening and a top of said at least one magnet extends through the holder opening, each magnet retained in the magnet insertion opening by a cover coupled to the magnet holder;
wherein said at least one magnet comprises two opposite polarities; and
wherein said plurality of magnet holders are coupled to said at least one end plate with said at least one magnet having at least one polarity adjacent a similar polarity of another of said at least one magnets.

14. The magnetic gear of claim 13, wherein said plurality of magnet holders are coupled perpendicular to an edge of said at least one end plate.

15. The magnetic gear of claim 13, wherein having one polarity adjacent a similar polarity of another of said at least one magnet creates a magnetic gear tooth.

16. The magnetic gear of claim 13, wherein said at least one end plate is circular.

17. The magnetic gear of claim 13, wherein said magnetic gear is a rack gear.

18. The magnetic gear of claim 13, wherein said plurality of magnet holders are removably coupled to said at least one end plate.

19. The magnetic gear of claim 13, wherein said at least one magnet is removably contained in said plurality of magnet holders.

20. The magnetic gear of claim 13, wherein said at least one magnet further comprises a dividing line between said two opposite polarities and wherein said at least one magnet is positioned with said dividing line parallel to a longitude of said at least one axle.

* * * * *

UNITED STATES PATENT AND TRADEMARK OFFICE
CERTIFICATE OF CORRECTION

PATENT NO. : 10,090,749 B2
APPLICATION NO. : 14/204903
DATED : October 2, 2018
INVENTOR(S) : Justin D. Kidd Page 1 of 1

It is certified that error appears in the above-identified patent and that said Letters Patent is hereby corrected as shown below:

In the Claims

In Claim 1, Column 10, Line 17, the word "in" should read "is;" and

In Claim 13, Column 12, Line 14, the word "in" should read "is."

Signed and Sealed this
Twentieth Day of November, 2018

Andrei Iancu
*Director of the United States Patent and Trademark Office*